Figure 1:
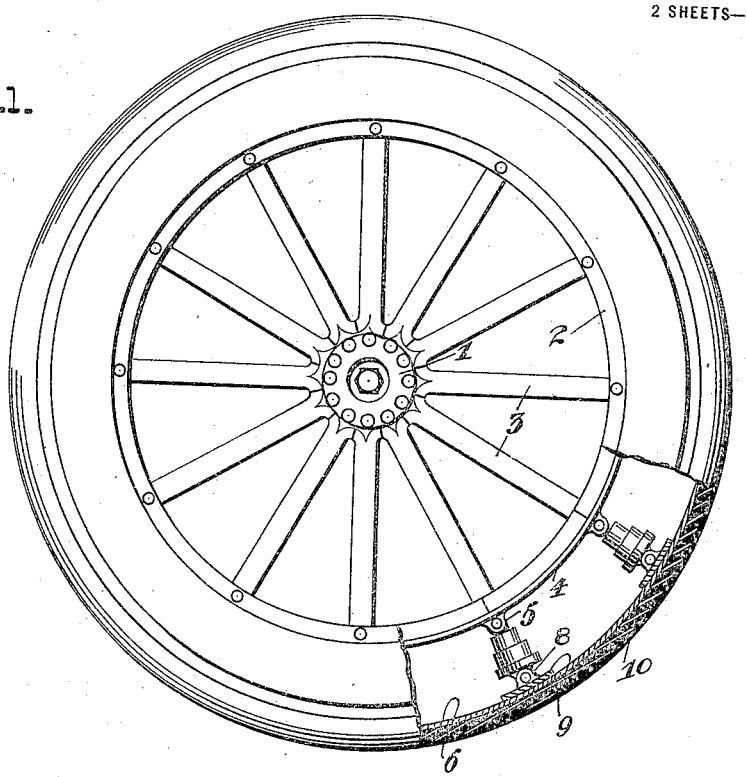

W. D. HOOK.
TIRE.
APPLICATION FILED FEB. 19, 1920.

1,363,596.

Patented Dec. 28, 1920.
2 SHEETS—SHEET 1.

WITNESSES

INVENTOR
William D. Hook.
BY
ATTORNEYS

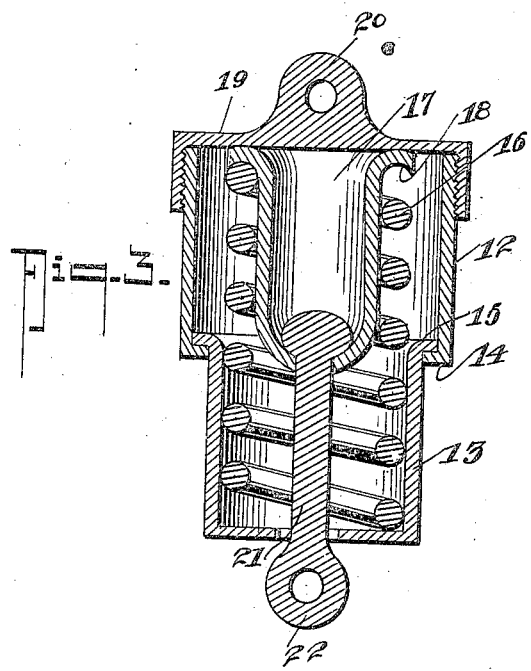
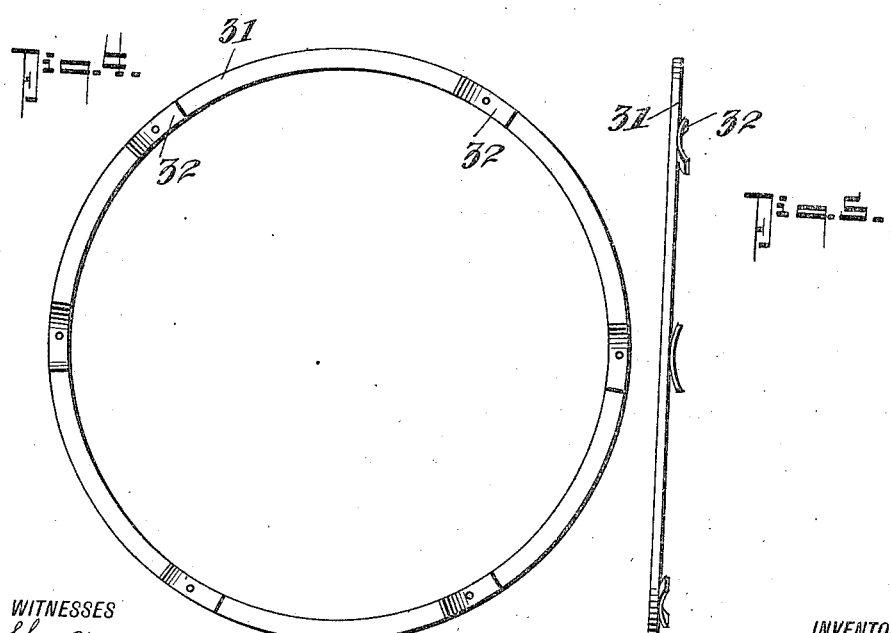

UNITED STATES PATENT OFFICE.

WILLIAM DOUGLASS HOOK, OF SAVANNAH, GEORGIA.

TIRE.

1,363,596.   Specification of Letters Patent.   Patented Dec. 28, 1920.

Application filed February 19, 1920. Serial No. 359,773.

*To all whom it may concern:*

Be it known that I, WILLIAM DOUGLASS HOOK, a citizen of the United States, and a resident of Savannah, in the county of Chatham and State of Georgia, have invented certain new and useful Improvements in Tires, of which the following is a specification.

My invention is an improvement in tires, and has for its object to provide a tire especially adapted for motor vehicles, and capable of being attached to the usual wheel, for providing as nearly as possible the resiliency of a pneumatic tire, without the liability of the said tire to injury from punctures, blowouts and the like.

Figure 2:
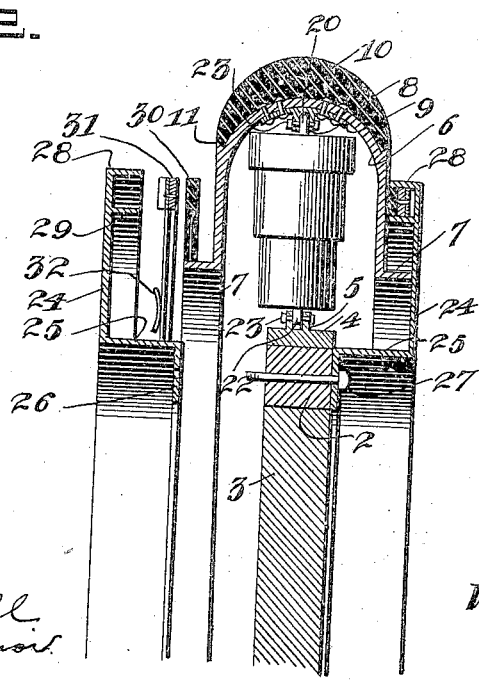

In the drawings:

Figure 1 is a side view of a wheel provided with the improved tire, with a part in section, Fig. 2 is a radial section with the parts separated, Fig. 3 is a sectional view of one of the spring casings, Figs. 4 and 5 are a plan view and an edge view respectively, of the packing ring.

The present embodiment of the invention is shown in connection with a wheel of usual construction, consisting of the hub 1, the felly 2, and the spokes 3 connecting the hub and the felly. A rim 4 is arranged on the felly, and this rim has at regular intervals pairs of radial perforated lugs 5. In the present instance, the lugs are arranged in line with the spokes 3 of the wheel.

A casing or auxiliary rim 6 is arranged concentric with the wheel in spaced relation, and it will be noticed that this casing or rim is U or channel-shaped in cross section, and is arranged with its channel inward. At the inner edge of each of the side walls there is an outwardly extending flange 7, the said flanges being continuous and annular.

In line with each pair of lugs 5 of the rim, there is a pair of lugs 8 on the casing 6, the said lugs in the present instance extending laterally from a curved plate 9 which is secured to the inner surface of the casing.

The casing 6 carries a tread 10 of rubber or the like, of sufficient thickness, and it will be noticed referring to Fig. 2 that the side walls of the casing are rabbeted as shown at 11, the rabbets being undercut, and that the tread fits in these rabbets, the rabbets providing shoulders for engagement by the tread to hold it firmly in place. The plates 9 are secured to the casing by rivets or the like.

A series of cushioning devices or spring assemblies is arranged between the auxiliary rim and the rim 4. Each of these assemblies as shown in Fig. 3, consists of a telescoping casing, composed of an outer section 12 and an inner section 13. The section 13 is of a diameter such that it would slide very loosely in the section 12, the sections 12 and 13 having coöperating laterally extending flanges 14 and 15 for engaging the outer face of the section 13 and the inner face of the section 12 respectively, during the sliding movement of the sections on each other, and to limit the movement of the sections away from each other.

A coil spring 16 is arranged within the casing 12—13, the said spring bearing at its inner end against the end of the section 13, and the spring is of approximately the diameter of the said section.

A bell 17 is arranged within that end of the spring which is in the section 12 of the casing, the bell having an outwardly extending marginal flange 18 which abuts the inner face of the end of the section 12. The said end is a head 19, which is threaded onto the end of the section 12, and this head carries a perforated lug 20 which is adapted to fit between the lugs 8 of a pair.

A link 21 is arranged within the spring 16, the link passing through an opening in the end of the bell, and being headed on the inside of the bell as shown. The link also passes through an opening in the end of the section 13, and has an eye 22 which is adapted to fit between a pair of lugs 5. The lugs 20 and 22 are pivotally connected to the lugs 8 and 5 respectively, by means of bolts and nuts 23. Housing plates 24 are arranged at the opposite sides of the tire. Each of these housing plates has at its inner edge an inwardly extending web 25 which is provided with a radial flange 26 lapping upon the adjacent face of the felly.

These flanges and the bell have registering openings for receiving bolts 27, which connect the side plates to the felly, and the webs 25 are of such length that when the flanges 26 abut the opposite faces of the felly, the free edges of the flanges 7 will abut the inner faces of the housing rings.

Each ring has at its outer edge a pair of inwardly extending annular webs 28 and 29 which are spaced apart from each other, the web 28 being at the margin of the ring, and the web 29 being spaced inwardly from the margin. These webs are of such depth that when the flanges 26 abut the felly, the free edges of the webs 28 and 29 will abut the outer face of the adjacent side wall of the casing 6.

A packing 30 is arranged between each housing ring and the casing 6. Each of these packings which is of annular form, and of suitable material, is engaged by a packing ring 31 arranged between the outer face thereof and the housing ring, and the said packing and packing ring are arranged in the annular space between the webs 28—29. This ring and packing are of a width corresponding to the width of the annular space, fitting within the said space.

A series of arched plate springs 32 is secured to the outer face of each ring 21, intermediate the ends of the spring, the springs being arranged with their convex faces toward the ring. These springs engage the housing rings 24, and press the packings 30 tightly against the casing 6.

Referring to Fig. 2, it will be seen that each ring 31 has secured to the inner face thereof a ring of material such as fiber. Thus a tight joint is provided between the housing rings and the casing, and the spring assemblies are housed within a dust-proof casing.

In use the head is suspended from the auxiliary rim or casing 6 by the spring assemblies, which in case of shock and jar will be pressed on the underside of the wheel and expanded on the upper side. A very resilient tire results, which has approximately the same resiliency as a pneumatic tire without its liability to injury from puncture and blow-out.

I claim:—

A spring wheel comprising an inner wheel, an auxiliary rim disposed in spaced relation thereto and of V-shape in cross section and having its sides spaced considerably from the sides of the inner wheel, laterally outwardly extending flanges at the edges of said rim, housing rings secured upon the sides of the wheel and formed angular in cross section whereby to define radially outwardly extending flanges, slidably engaging against the edges of said flanges, spaced concentric flanges formed at the outer portions of said last named flanges and defining channels outwardly of said first named flanges, rings disposed between said concentric flanges and engaging the auxiliary rim, springs carried by said rings and engaging the bottoms of said channels, and cushioning members between the inner wheel and said auxiliary rim.

WILLIAM DOUGLASS HOOK.